United States Patent
Sako et al.

(10) Patent No.: US 6,661,758 B2
(45) Date of Patent: Dec. 9, 2003

(54) HIGH SPEED DATA RECORDING AND/OR REPRODUCING METHOD AND APPARATUS WITH INCREASED SECTOR ACCESS SPEED

(75) Inventors: Yoichiro Sako, Chiba (JP); Tamotsu Yamagami, Kanagawa (JP); Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/117,110

(22) Filed: Apr. 8, 2002

(65) Prior Publication Data

US 2002/0110070 A1 Aug. 15, 2002

Related U.S. Application Data

(63) Continuation of application No. 08/658,715, filed on Jun. 5, 1996.

(30) Foreign Application Priority Data

Jun. 7, 1995 (JP) ............................................ P7-164764

(51) Int. Cl.[7] ................................................ G11B 7/00
(52) U.S. Cl. .................................. 369/53.35; 369/53.15
(58) Field of Search ............................. 369/53.1, 53.12, 369/53.35, 53.15, 53.21, 53.32

(56) References Cited

U.S. PATENT DOCUMENTS 5,517,484 A * 5/1996 Takagi et al. .................. 369/54
5,666,335 A * 9/1997 Horibe .......................... 369/54

* cited by examiner

Primary Examiner—Nabil Hindi
(74) Attorney, Agent, or Firm—Oblon, Spivak, McClelland, Maier & Neustadt, P.C.

(57) ABSTRACT

A header in which an address signal has been recorded is provided on the disc for every predetermined sector interval. Recording data is arranged in an error correction encoding block and the error correcting process is performed. The error correction encoding block is divided into a plurality of portions in a predetermined direction, thereby forming sectors S1, S2, S3, . . . . The data of each sector is recorded subsequent to the header. Upon reproduction, the header is detected and the data is reproduced for every sector. One of the error correcting processes is performed in the reproduced data in the sectors S1, S2, S3, . . . . In the case where errors cannot be corrected by the error correcting process in the reproduced data in the sector, the error correction block including the sectors S1, S2, S3, . . . is reproduced and the error correcting processes are performed in the sequences in two directions.

16 Claims, 10 Drawing Sheets

HIGH SPEED DATA RECORDING AND/OR REPRODUCING METHOD AND APPARATUS WITH INCREASED SECTOR ACCESS SPEED

BACKGROUND OF THE INVENTION

1. Field of the Invention

The present invention relates to a signal processing method which is suitable in the case where data for the computer is recorded to an optical disc or the case where such data recorded on an optical disc is reproduced.

2. Description of the Prior Art

As a memory medium for recording a digital video signal which has been compressed by an MPEG (Moving Picture Experts Group) technique or the like, a DVD (digital video disc) has been developed. The DVD is an optical disc which has the same diameter as that of a CD (compact disc) and in which recording density has been further improved by progress in realization of a short wavelength laser beam, an increase in numerical aperture NA of an objective lens, and an improvement in processes for digital modulation and error correction encoding. Even in the case of a single-layer disc, the DVD has an extremely large data memory capacity, for example, about 3.7 Gbytes. As a form of DVD, there has been proposed a disc which is recordable and reproducible by using an MO disc or a phase-change type optical disc in addition to a read only optical disc.

It has been proposed that such a DVD be used as an external memory device of a computer. That is, as an external memory device of the computer, an optical disc drive has advantages such as large capacity and high-speed access. A CD-ROM and a CD-I (CD-Interactive) constructed in a manner such that data is recorded to a CD, MD (mini disc) data which is recorded and reproduced to/from an MD (mini disc), and the like have already been proposed. Since the DVD has an extremely large data memory capacity of about 3.7 Gbytes, the DVD can act as an external memory medium of larger capacity.

In the DVD, in order to protect recorded data, an error correction encoding process is performed. Since sequential data such, as video data, is handled in the DVD, a cross interleave code of a convolution type is used. However, when the convolution code is used, it is difficult to access the data on a sector unit basis and to read and write the data. In the case where the DVD is used as an external memory medium for recording and reproducing computer data, it is necessary to access the data on a sector unit basis and to read and write the data, so that it is necessary to use a code of a block completion type.

FIG. 9 shows an example of generating the convolution type cross interleave code. As shown in FIG. 9, a parity P of, for example, eight bytes is added to, for example, 162 bytes in the vertical direction in a C1 sequence. In a C2 sequence, a parity Q of, for example, 14 bytes is added in the oblique direction. By adding data of 148 bytes in the vertical direction, parity P of 8 bytes, parity Q of 14 bytes, the number of data bytes in the vertical direction is equal to 170 bytes. The data recorded on the disc is read out therefrom synchronously with the frame. One frame is equal to 85 bytes. The data of 170 bytes in the vertical direction is equal to two frames.

As mentioned above, although the convolution type cross interleave code is used in the DVD, it is difficult to access every block of the data and read and write the data by using the convolution type code. A cross interleave code of the block completion type has, therefore, been proposed.

FIG. 10 shows an example of processes in the case of generating the block completion type cross interleave code. In order to realize a common construction with the case of the above-mentioned convolution code, the number of data bytes in the vertical direction is set to 148 bytes, the parity P is set to eight bytes, the parity Q is set to 14 bytes, and the total number of data bytes in the vertical direction is set to 170 bytes. Since one sector is set to, for example, 16 kbytes, the number of data bytes in the horizontal direction is set to 112 bytes (148×112=16576 bytes). When the block completion type cross interleave code is used, a length of interleave is longer than a width of the block. Therefore, as shown in FIG. 10, when the number of data bytes in the horizontal direction reaches the length of 112 bytes, an aliasing of the C2 sequence occurs. As shown in FIG. 10, when the block completion type cross interleave code is used, data can be read and written at every block such that it is suitable for a case where the DVD is used as an external memory medium for recording and reproducing data for the computer.

As a sector size in the case where data is recorded and reproduced to/from a data recording medium such as a DVD or the like becomes large, the disc can meet requirements for high density and high reliability. In association with it, the file size to be handled becomes larger. Therefore, in recent years, there is a tendency to increase the sector size of data recording medium such that the size of one sector has been changed from an initial 512 bytes to 1024 bytes and, further, to 2 kbytes.

However, since the access to the recording medium is performed on a sector unit basis, as the sector size becomes larger, it takes a long time for reading and reproducing. There is, consequently, a problem such that an accessing speed including error correction encoding and decoding processes decreases. In addition to the problem of compatibility with a sector of an existing data recording medium, there is a further demand for a small sector.

In the case of recording data to the DVD, however, when the number of sectors is reduced, the reliability of the data deteriorates.

That is, in the above-mentioned example, the sector size is set to 16 kbytes. When the sector size is set to 16 kbytes, as shown in FIG. 10, an aliasing of the C2 sequence occurs once.

Since the block shown in FIG. 10 has 16 kbytes, when such a block is divided into eight portions, a sector of 2 kbytes can be constructed. However, as shown in FIG. 11, when the block of 16 kbytes is divided into eight portions to form each sector of 2 kbytes (14×148=2072 bytes) and the error correction encoding is performed by using the cross interleave code in a manner similar to the foregoing example, many aliasings occur in the C2 sequence. Thus, sufficient error correction cannot be performed.

As mentioned above, when the sector size is increased, although the reliability of data is improved, there is a drawback because the accessing speed becomes slow. On the contrary, when the sector size is reduced, although the accessing speed is raised, there is a drawback because the reliability of data deteriorates.

OBJECT AND SUMMARY OF THE INVENTION

It is, therefore, an object of the invention to provide a recording and reproducing method whereby a sector of a small size can be accessed and an accessing speed can be raised while maintaining a reliability of data.

According to the invention, there is provided a data recording method whereby an address signal is recorded to a disc for every sector, data is arranged in an error correction encoding block and is subjected to an error correction encoding process, the error correction encoding block is divided into a plurality of portions in a predetermined direction to thereby form sectors, and the data of each sector is recorded in correspondence to the address signal.

According to the invention, there is provided a method of reproducing data from a disc in which an address signal for each sector has been recorded and data of each sector has been recorded in correspondence to the address signal, wherein the data of each sector is formed by dividing an error correction encoding block into a plurality of portions in a predetermined direction, the address signal of the disc is detected, the data is reproduced for every sector, an error correcting process is executed for the reproduced data in the sector, and when errors cannot be corrected by the error correcting process in the reproduced data in the sector, an error correction block including such a sector is reproduced, and the error correcting process is performed for the reproduced data in the error correction block.

A header is recorded at every predetermined sector interval on the disc. The address signal is included in the header. Recording data is arranged in an error correction encoding block and an error correction encoding process is performed. The error correction encoded block is divided into a plurality of portions in a predetermined direction, thereby forming sectors. Subsequent to the header, the data of each sector is recorded. Since the sector is formed by dividing the error correction encoded block into a plurality of portions in the predetermined direction, when the error correction encoding is performed in two directions by the error correction encoding blocks, one of the error correcting processes can be executed in each sector. Upon reproduction, the header is detected and the data is reproduced for every sector. One of the error correcting processes is executed in the reproduced data in the sector. When the errors cannot be corrected by the error correcting process in the reproduced data in the sector, the error correction block including such a sector is reproduced. The error correcting processes are executed in the sequences in the two directions. By using the above method, a sector of a small size can be handled without a deterioration of the reliability of data.

The above and other objects and features of the present invention will become apparent from the following detailed description and the appended claims with reference to the accompanying drawings.

DETAILED DESCRIPTION OF THE PREFERRED EMBODIMENTS

Figure 1:
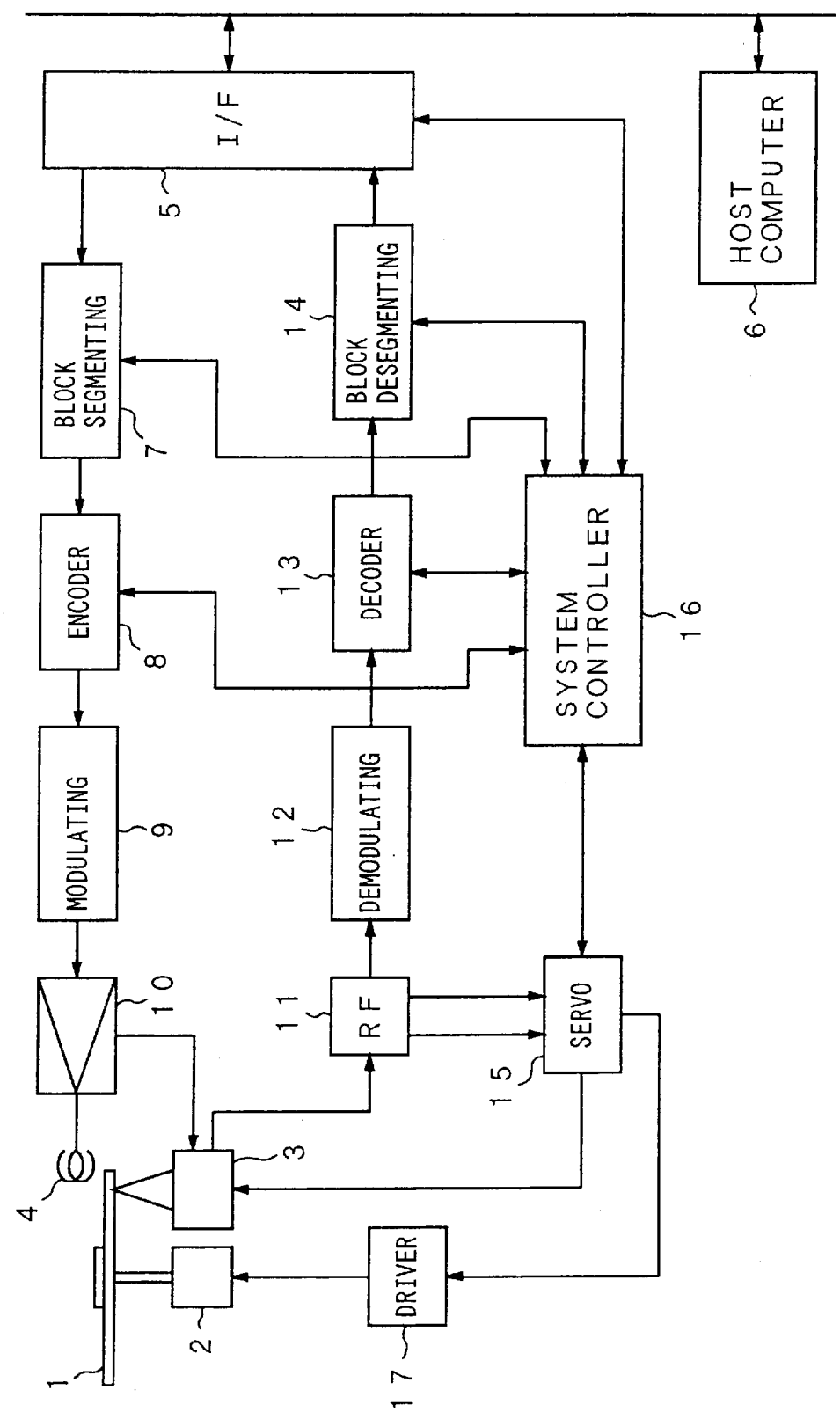
FIG. 1 is a block diagram of an example of a recording/reproducing apparatus to which the invention can be applied.

An embodiment of the invention will now be described hereinbelow with reference to the drawings. FIG. 1 shows an example of a data recording/reproducing apparatus to which the invention can be applied. In this example, a block for an error correction encoding is set to, for example, 16 kbytes and a sector size is set to, for example, 2 kbytes. Data can be handled every sector of 2 kbytes.

In FIG. 1, reference numeral 1 denotes an optical disc. The optical disc 1 is rotated by a spindle motor 2. In the example, as an optical disc 1, a magneto-optical disc is used. A fundamental construction of the optical disc 1 is similar to that of a DVD for recording a digital video signal and a data memory capacity is set to about 3.7 Gbytes. A phase-change type disc can be used as the optical disc 1. Data is recorded and reproduced to/from the optical disc 1 for every sector.

An optical pickup 3 and a magnetic head 4 are provided for the optical disc 1. The optical pickup 3 and magnetic head 4 can be integratedly moved in the radial direction of the disc by a thread feeding mechanism (not shown).

Reference numeral 5 denotes an interface. As the interface 5, for example, the SCSI type interface is used. Data and commands are transmitted and received to/from a host computer 6 through the interface 5.

In the case of recording data to the optical disc 1, the data is inputted from the interface 5. The data is supplied to a block segmenting circuit 7. The block segmenting circuit 7 segments recording data into blocks in order to perform error correction encoding of a block completion type.

An error correction encoding circuit 8 executes an error correction encoding process by an error correction code of the block completion type. The error correction encoding process is performed for every block by the error correction encoding circuit 8.

As will be described hereinbelow, the block for the error correction encoding is divided into a plurality of portions that are set to sectors. That is, one block is constructed by a plurality of sectors. In the optical disc 1, a header including an address signal is provided by, for example, a pre-pit. Data of the sectors is recorded subsequent to the header including the address signal.

An output of the error correction encoding circuit 8 is supplied to a modulating circuit 9. Data is subjected to a modulation such as an EFM (Eight to Fourteen Modulation) or the like in the modulating circuit 9. An output of the modulating circuit 9 is supplied to the magnetic head 4 via a driver 10. A magnetic field modulated by the data is applied from the magnetic head 4 onto the optical disc 1 and a laser beam is also irradiated from the optical pickup 3 onto the disc 1. Thus, the data is recorded to the optical disc 1.

As mentioned above, in the example, as a data recording method, a magnetic field modulating system such that when data is written, the magnetic field modulated by data is applied from the magnetic head 4 and the laser beam is also irradiated from the optical pickup 3 is used. The invention is not limited to the magnetic field modulating system.

Upon reproduction, a reproduction signal of the optical disc 1 is obtained from the optical pickup 3. The reproduction signal is supplied to an RF amplifier 11. The reproduction signal from the RF amplifier 11 is supplied to a demodulating circuit 12. The data is demodulated by the demodulating circuit 12. An output of the demodulating circuit 12 is supplied to an error correction decoding circuit 13.

As mentioned above, the header including the address signal is recorded on the optical disc 1. The data can be reproduced by accessing a desired sector by the header. The error correction decoding circuit 13 executes the error correcting process of the sector in the C1 sequence. When error correction is not possible in only the C1 sequence, all of error correction blocks including the sector are reproduced and the error correcting process is performed by using the C1 and C2 sequences.

An output of the error correction decoding circuit 13 is supplied to a block desegmenting circuit 14. The block desegmenting circuit 14 executes a process corresponding to the foregoing block segmenting circuit 7. An output of the block desegmenting circuit 14 is sent to the interface 5 and the data is outputted to the host computer 6 via the interface 5.

A tracking error signal and a focusing error signal are outputted from the RF amplifier 11. The tracking error signal and focusing error signal are supplied to a servo circuit 15. The servo circuit 15 generates a tracking control signal, a focusing control signal, a control signal of a thread motor, a control signal of a laser power, a control signal of the spindle motor, and the like under management of a system controller 16. The tracking control signal, focusing control signal, and control signal of the thread motor are supplied to an objective lens driving unit or the thread motor of the optical pickup 3, so that a tracking servo control and a focusing servo control are executed. The control signal of the laser power is supplied to the optical pickup 3, so that the optimum laser power is set in accordance with the recording mode or the reproducing mode. The control signal of the spindle motor is supplied to the spindle motor 2 through a driver 17, thereby controlling the rotation of the optical disc.

In the embodiment of the invention, as mentioned above, the block for the error correction encoding is constructed by a plurality of sectors. The block for the error correction encoding consists of, for example, 16 kbytes and the sector consists of 2 kbytes.

Figure 2A:
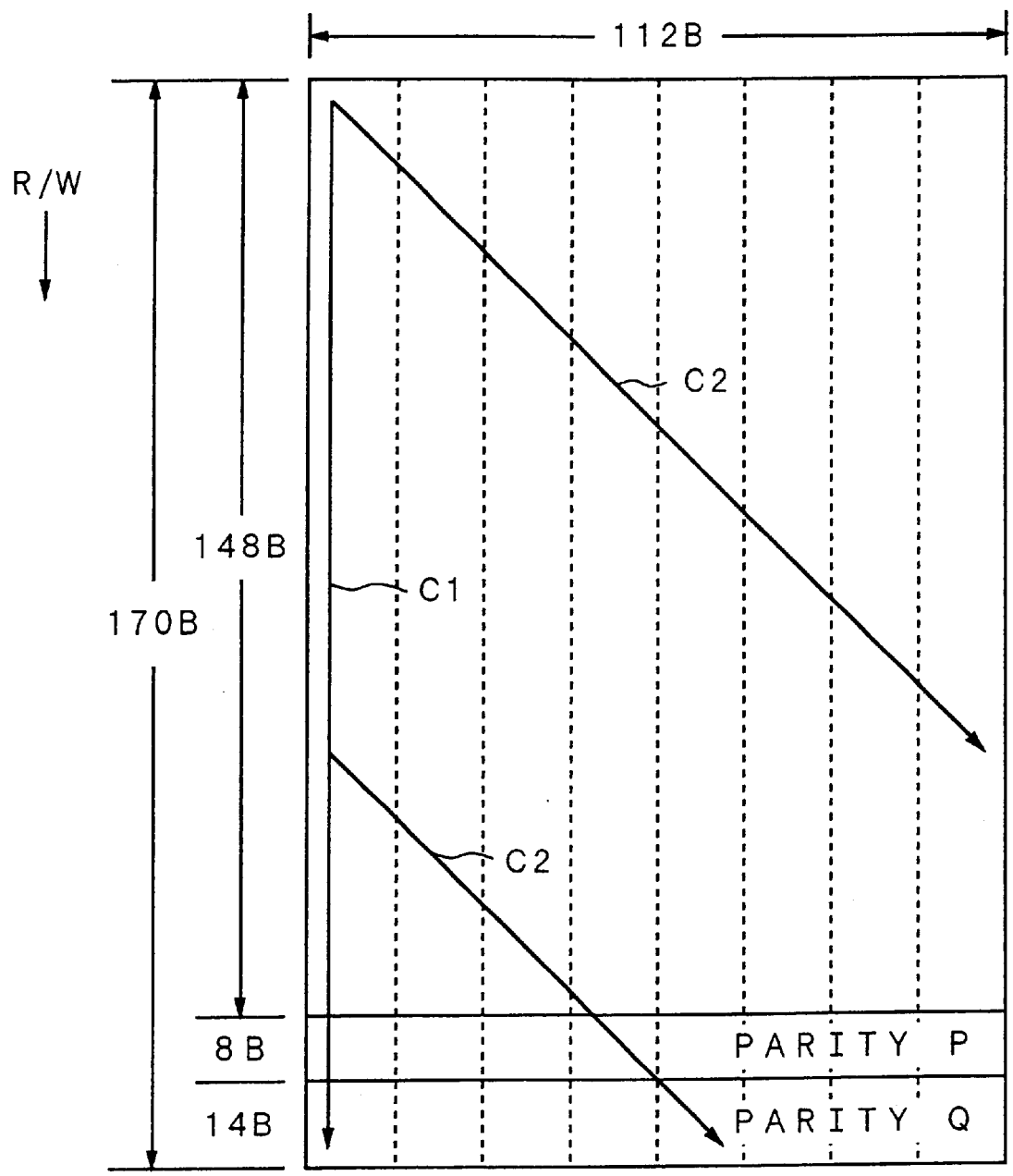
FIGS. 2A and 2B are schematic diagrams which are used for explaining an embodiment of the invention.

FIG. 2A shows an example of the block for the error correction encoding. As shown in FIG. 2A, data of 148 bytes in the vertical direction and 112 bytes in the horizontal direction is arranged. A parity P of eight bytes is added in the C1 sequence in the vertical direction and a parity Q of 14 bytes is added in the C2 sequence in the oblique direction. The block constructed by 170 bytes (data of 148 bytes, parity P of 8 bytes, and parity Q of 14 bytes) in the vertical direction and 112 bytes in the horizontal direction as mentioned above is set to the block for the error correction encoding. In the C1 sequence, the (170, 162, 9) Reed Solomon code is used. In the C2 sequence, the (170, 156, 15) Reed Solomon code is used. Data is read and written in the vertical direction.

Figure 2B:
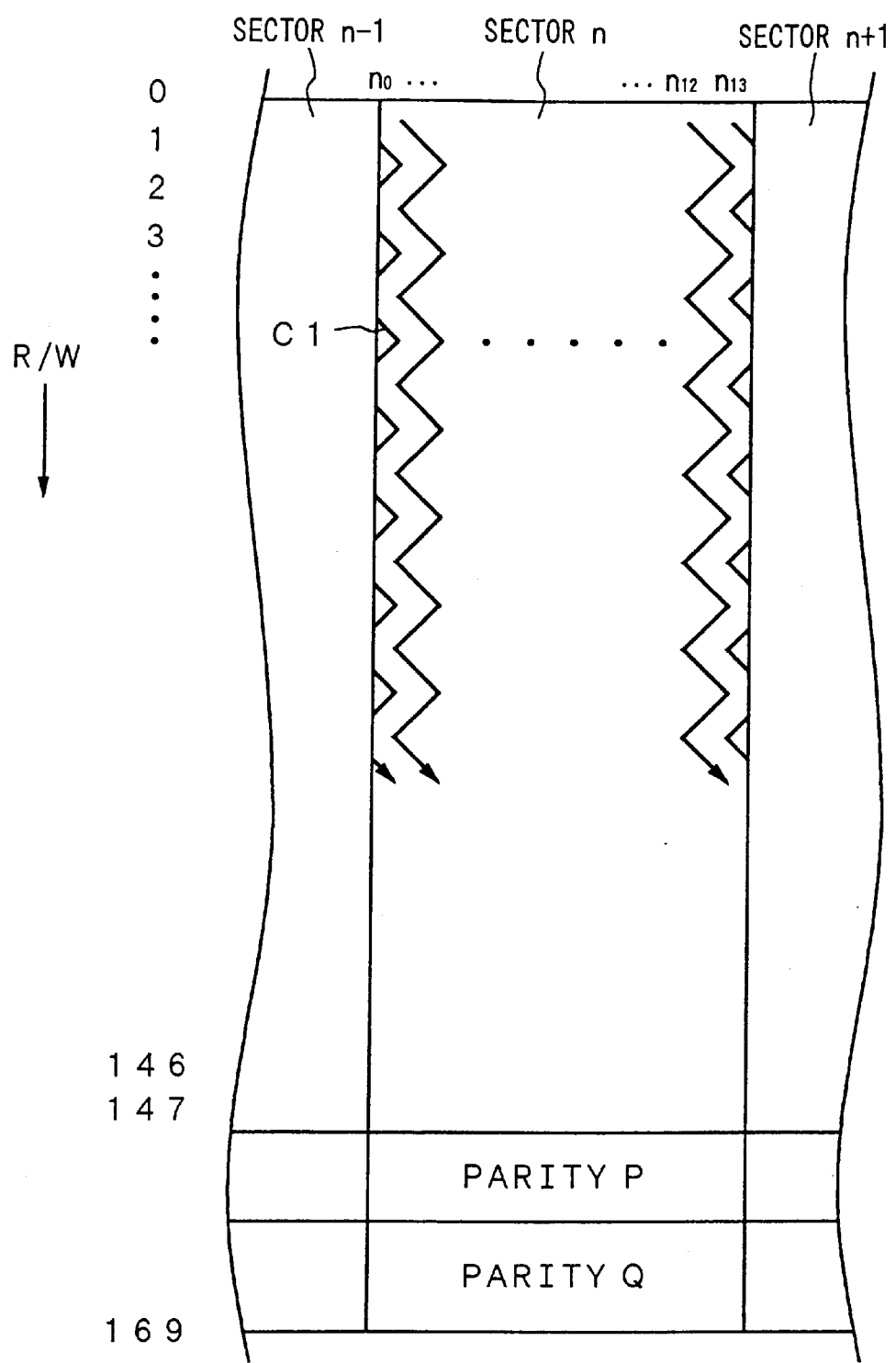
Figure 10:
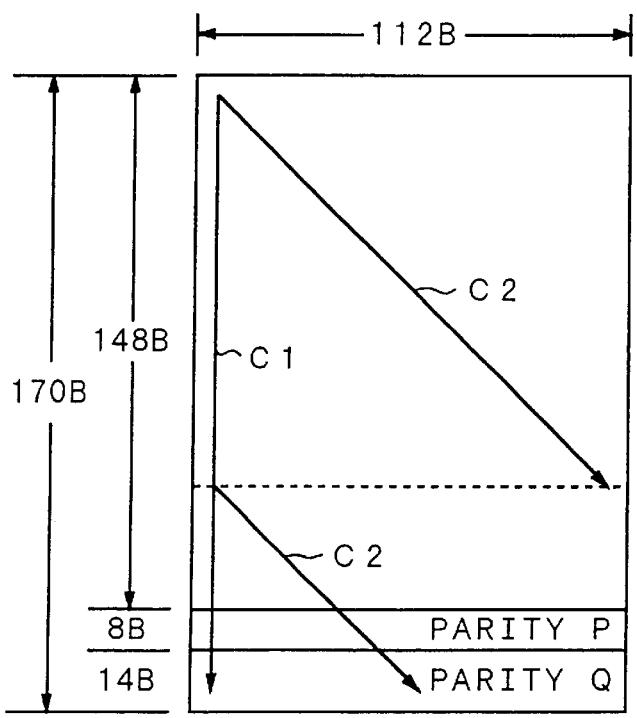
FIG. 10 is a schematic diagram which is used for explaining the conventional data recording method.
Figure 11:
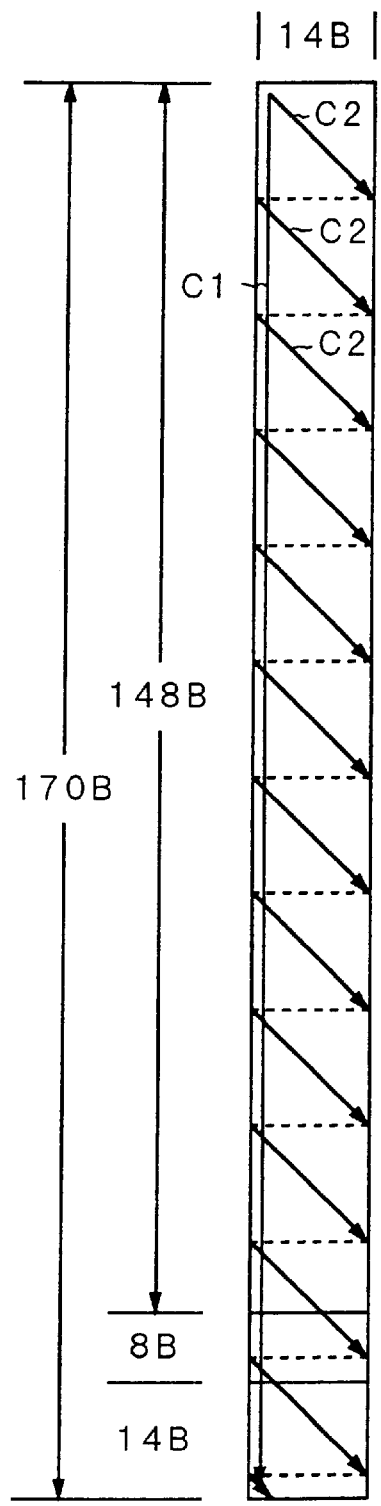
FIG. 11 is a schematic diagram which is used for explaining the conventional data recording method.

The outward appearance or outward structure of the block shown in FIG. 2A is fundamentally the same in appearance as that of the cross interleave code of the block completion type shown in FIG. 10. However, a zigzag interleave in the vertical direction is ordinarily performed on a block-by-block basis relative to the block completion type data of FIG. 10 and such a zigzag interleave cannot be executed so as to complete the error correction code on a sector-by-sector basis for every sector. On the other hand, and as shown in FIG. 2B relative to the present invention, the interleave is performed between both end data (the $n_0$-th column and the $n_{13}$-th column) so as to perform the interleave on a sector-by-sector basis for each sector and so as not to perform the interleave between two adjacent sectors.

Figure 3:
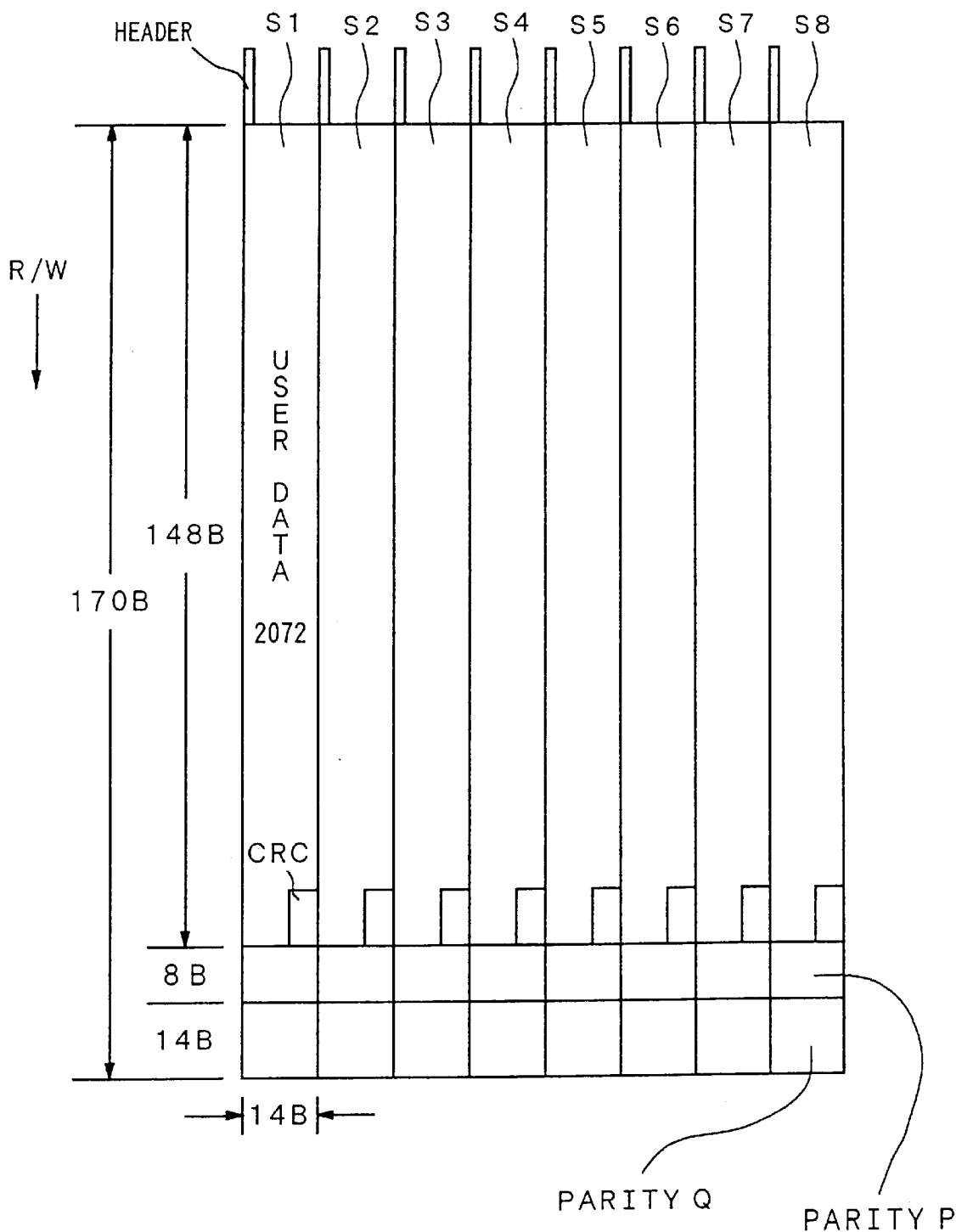
FIG. 3 is a schematic diagram which is used for explaining the embodiment of the invention.

As shown in FIG. 3, eight portions obtained by dividing one block for the error correction encoding are set to sectors S1, S2, S3, . . . , and S8. That is, each of sectors S1 to S8 consists of 14 bytes in the horizontal direction and 148 bytes in the vertical direction. A data capacity of one sector is 148×14=2072 bytes.

When the parities P arid Q are included,

170×14=2380 bytes.

Figure 4:
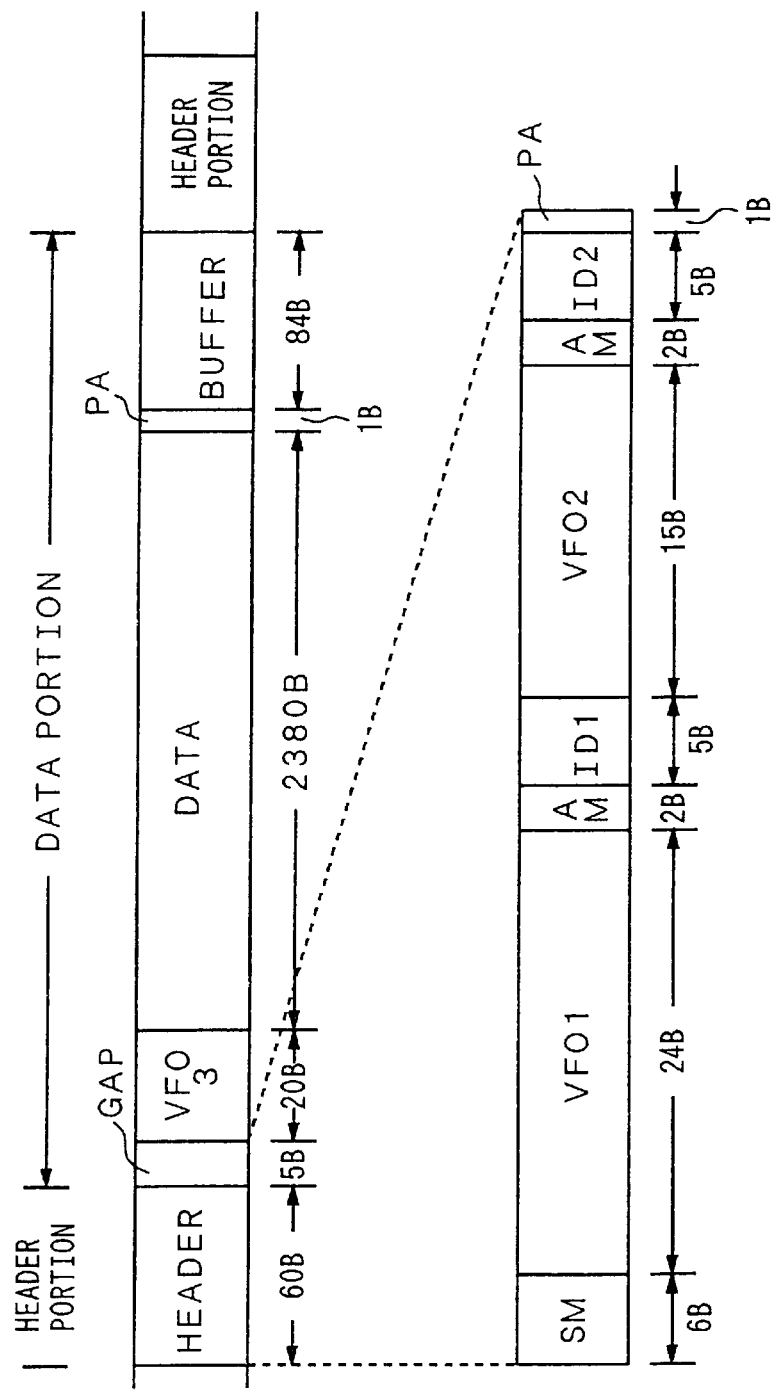
FIGS. 4A and 4B are schematic diagrams of an example of a construction of a header which is used for explaining the embodiment of the invention.

FIGS. 4A and 4B show a construction of each of the sectors S1 to S8. As shown in FIG. 4A, each sector consists of a header portion and a data portion. As shown in FIG. 4B, the header portion is constructed by: a sector mark (SM) of six bytes which is used for sector detection; a VF01 of 24 bytes and a VF02 of 15 bytes which are used for PLL pull-in; an address mark (AM) of two bytes which is used for address detection; and addresses (ID1 and ID2) each consisting of five bytes. A track address, a sector address, and an error detection code CRC are included in the address. The sector portion is formed by, for example, the pre-pit.

As shown in FIG. 4A, the data portion is constructed by a VF03 of 20 bytes which is used for the PLL pull-in, data of 2380 bytes, and the error correction code. Further, a buffer, a gap, and the like which are used to absorb a jitter of the spindle motor, an eccentricity of the disc, and the like are included. Upon recording, syncs (sector sync, frame sync) for synchronizing the data are added to the data of 2380 bytes by the demodulating circuit 9. In the data of 2380 bytes, 2072 bytes correspond to user data. A CRC code for the error detection is included in the user data, so that the data can be protected.

As mentioned above, the header portion is provided at the head of each sector. Upon reproduction, the data is accessed for every sector by using the header portion. With respect to the data of one sector, the error correcting process can be performed in the C1 sequence by using the parity P. When the error correction is performed in the C1 sequence and it is judged that error correction is not possible using only the C1 sequence, all of the error correction blocks including the sector are reproduced and the error correction process is executed by using the C1 and C2 sequences.

Figure 5:
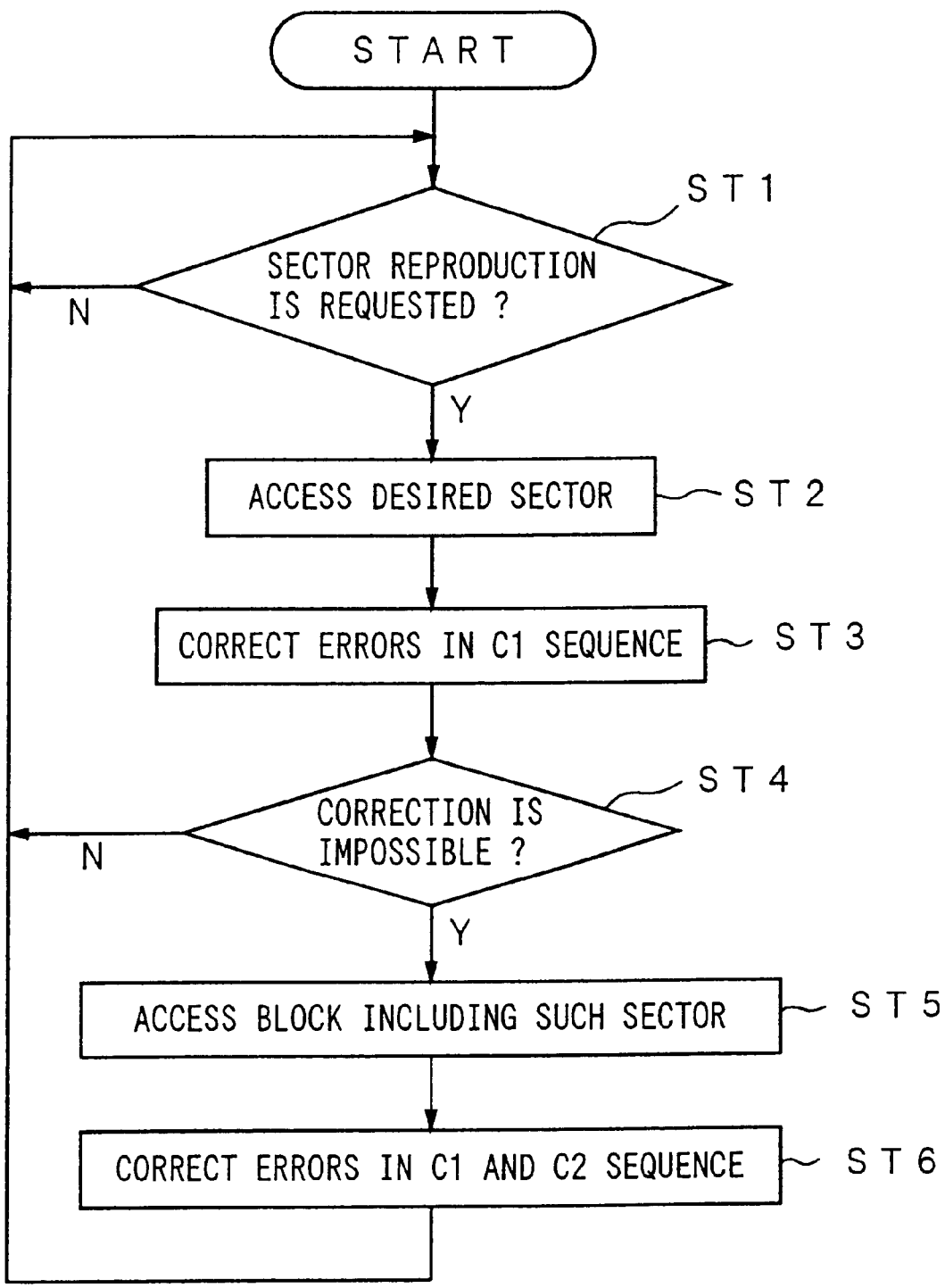
FIG. 5 is a flowchart which is used for explaining the embodiment of the invention.

Subsequently, an example of the reproducing operation of the data recording/reproducing apparatus described in FIG. 1 will now be explained hereinbelow with reference to a flowchart shown in FIG. 5.

First in step ST1, a command to reproduce the desired sector data is sent to the interface 5 through a bus from the host computer 6. The command is transmitted to the system controller 16 and it is judged in step ST1 that there is a request to reproduce the desired sector data. In step ST2, the system controller 16 controls the servo circuit 15 in accordance with the transmitted command and moves the optical pickup 3 to the desired sector on the optical disc 1 while referring to the header portion shown in FIG. 4A. After the optical pickup 3 is moved to the desired sector position, the desired sector data is reproduced through the RF amplifier 11 and demodulating circuit 12. The reproduced data is inputted to the error correction decoding circuit 13. In step ST3, in the error correction decoding circuit 13, the error correcting process using the parity P constructed by the C1 sequence shown in FIGS. 2A and 2B is performed relative to the reproduced desired sector data. In step ST4, the system controller 16 monitors whether the error correction exceeds a correcting ability by the parity P or not. When the error correction lies within a range of the correction ability, namely, when it is judged that the error correction could normally be executed, the system controller 16 generates the error corrected desired sector data to the block desegmenting circuit 14. The block desegmenting circuit 14 generates the desired sector data as it is to the interface 5. The desired sector data is transmitted to the host computer 6 via a data bus. When the errors of the sector data exceed the correcting ability by the parity P and the error correction is not possible in step ST4, all of the data in the block including the reproduced desired sector is fetched into the error correction decoding circuit 13 in step ST5. In step ST6, by using the C1 sequence (parity P) and the C2 sequence (parity Q) shown in FIG. 2A, the error correction of the reproduced block data is performed. In the block desegmenting circuit 14, the desired sector requested from the host computer 6 by the system controller 16 is extracted from the block data decoded by the error correction decoding circuit 13. The extracted desired sector data is transmitted to the host computer 6 through the interface 5 and data bus. In the example of the foregoing operation, in step ST2, the system controller 16 controls in a manner such that only the desired sector data is fetched into the error correction decoding circuit 13. However, for example, in the case where a reproducing request from the host computer 6 is a request to reproduce a plurality of continuous sector data, the data of the block including the desired sector can be also previously fetched to the error correction decoding circuit 13. In this case as well, since the optical pickup 3 accesses the continuous data on the optical disc 1, as compared with the foregoing example, the time which is required to access data only increases slightly. Therefore, the reproducing operation can be performed at a processing speed higher than that of the conventional process. That is, since the error correcting process using the C1 and C2 sequences is limited to the case where the error correction is not possible using only the C1 sequence, the speed of a series of processes for data access can be improved.

As mentioned above, in the present embodiment, irrespective of the fact that the error correction encoding block consists of 16 kbytes, the reproduction can be performed for every sector of 2 kbytes. Upon reproduction, since it is sufficient to merely access a sector (2 kbytes) of a small size without accessing one block (16 kbytes), the data accessing speed is increased. In the case where errors occur which cannot be corrected in only the C1 sequence, the error correcting processes using the C1 and C2 sequences is performed using the error correction encoding block and the reliability of data is not lost.

Figure 6:
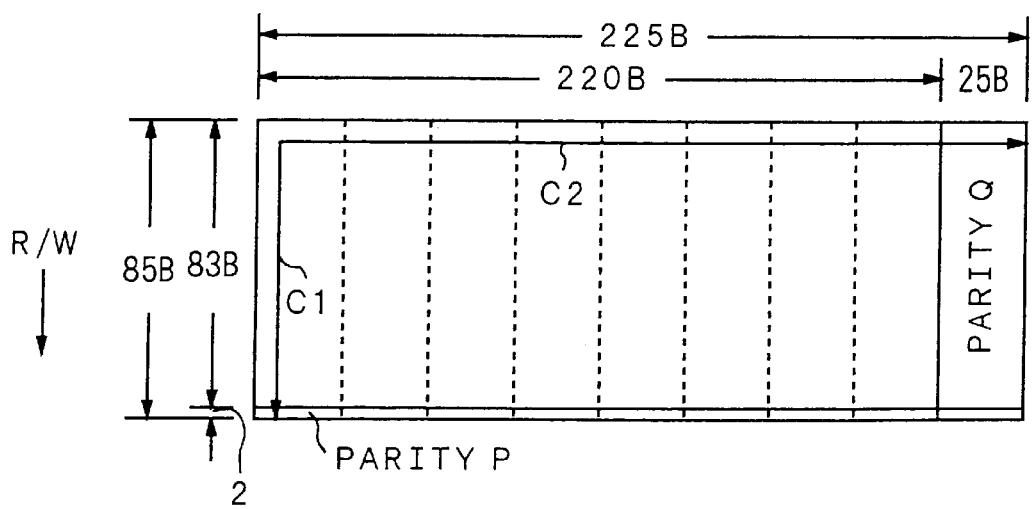
FIG. 6 is a schematic diagram which is used for explaining another embodiment of the invention.

FIG. 6 shows a data block in another embodiment of the invention. Although the cross interleave code is used in the foregoing embodiment, a product code is used in this embodiment.

As shown in FIG. 6, data of 83 bytes in the vertical direction and 200 bytes in the horizontal direction is arranged. The parity P of 2 bytes is added in the C1 sequence in the vertical direction and the parity Q of 25 bytes is added in the C2 sequence in the horizontal direction. As mentioned above, the block for the error correction encoding is constructed by 85 bytes (the data of 83 bytes and the parity P of 2 bytes) in the vertical direction and 225 bytes (the data of 200 bytes and the parity Q of 25 bytes) in the horizontal direction. In the C1 sequence, the (85, 83, 3) Reed Solomon code is used and the (225, 220, 26) Reed Solomon code is used in the C2 sequence.

Figure 7:
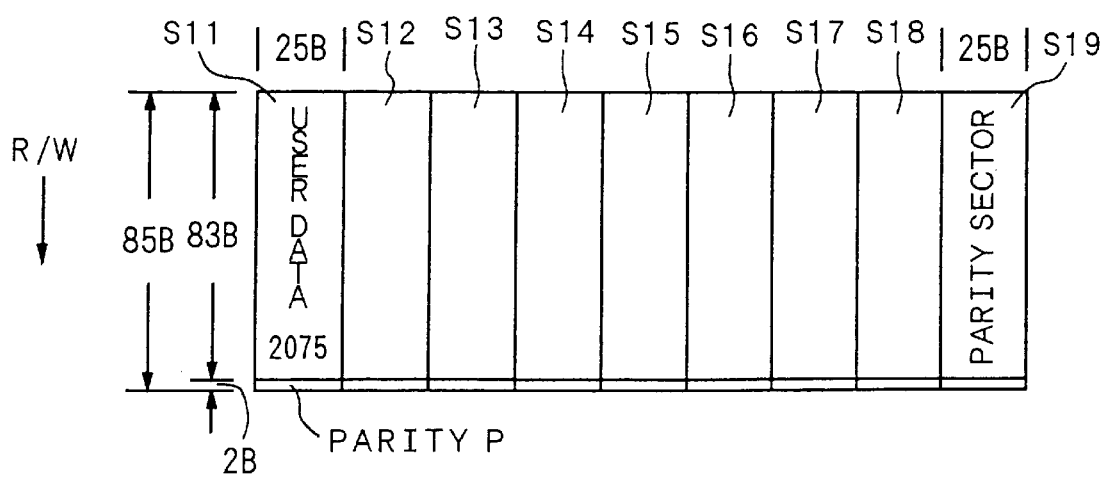
FIG. 7 is a schematic diagram which is used for explaining another embodiment of the invention.

As shown in FIG. 7, one block for the error correction encoding is divided into nine portions and the divided portions are set to sectors S11, S12, S13, . . . , S19. A length of the block for the error correction encoding in the horizontal direction is equal to 225 bytes. Since the sector is constructed by dividing the block into nine portions, a length of the sector in the horizontal direction is equal to 25 bytes. In the C2 sequence, the parity Q of 25 bytes is added. Therefore, among the sectors S11 to S19, the sector S19 is a sector for only the parity. Such a sector is called a parity sector hereinbelow.

A data capacity of each of the sectors S11 to S18 except the parity sector S19 is equal to $$83 \times 25 = 2075 \text{ bytes}$$

When including the parity P, $$85 \times 25 = 2125 \text{ bytes}$$

Data is read and written in the vertical direction. The whole parity sector S19 is composed of the parities P and Q and its size is equivalent to that of each of the sectors S11 to S18.

In a manner similar to the foregoing embodiment, the data of each sector is arranged subsequent to the header portion in which the address has been recorded. The construction of the header portion can be constructed in a manner similar to that shown in FIGS. 4A and 4B. The reproducing operation is executed in a manner similar to the operation shown in FIG. 5.

That is, upon reproduction, the data is accessed for every sector S11, S12, S13, . . . by using the header portion. In the data of one sector, the error correcting process can be performed by using the parity P in the C1 sequence. When the error correcting process is performed in only the C1 sequence and errors cannot be corrected in only the C1 sequence, all of the error correcting blocks including such a sector are reproduced, and the error correcting processes are performed by using the C1 and C2 sequences.

In this embodiment, the parity sector S19 is provided. Therefore, in case of rewriting the data every sector, it is possible to cope with such a rewriting operation by merely rewriting the parity sector S19, so that it is easy to rewrite the data for every sector. The data rewriting operation of the data recording/reproducing apparatus of this embodiment will now be described hereinbelow with reference to FIG. 8.

Figure 8:
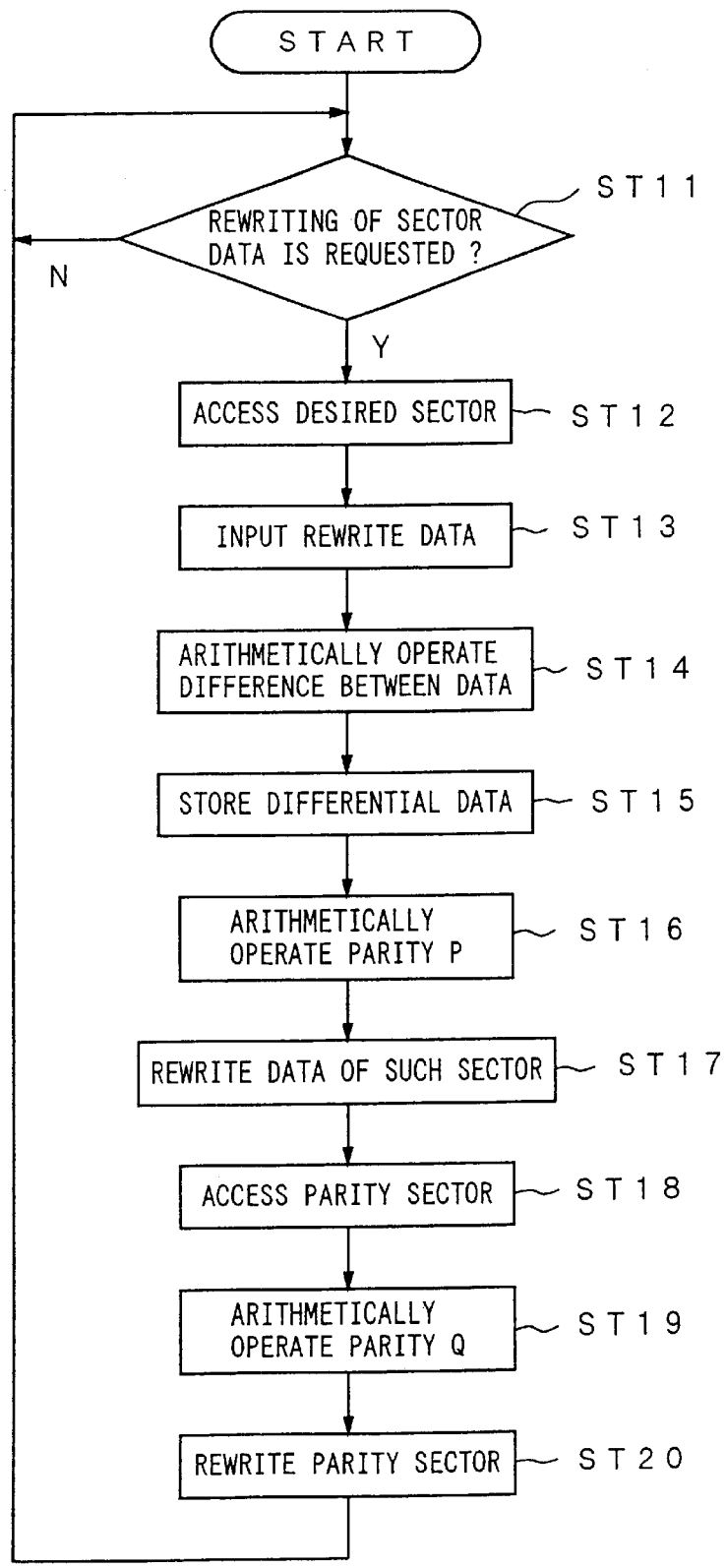
FIG. 8 is a flowchart which is used for explaining another embodiment of the invention.
Figure 9:
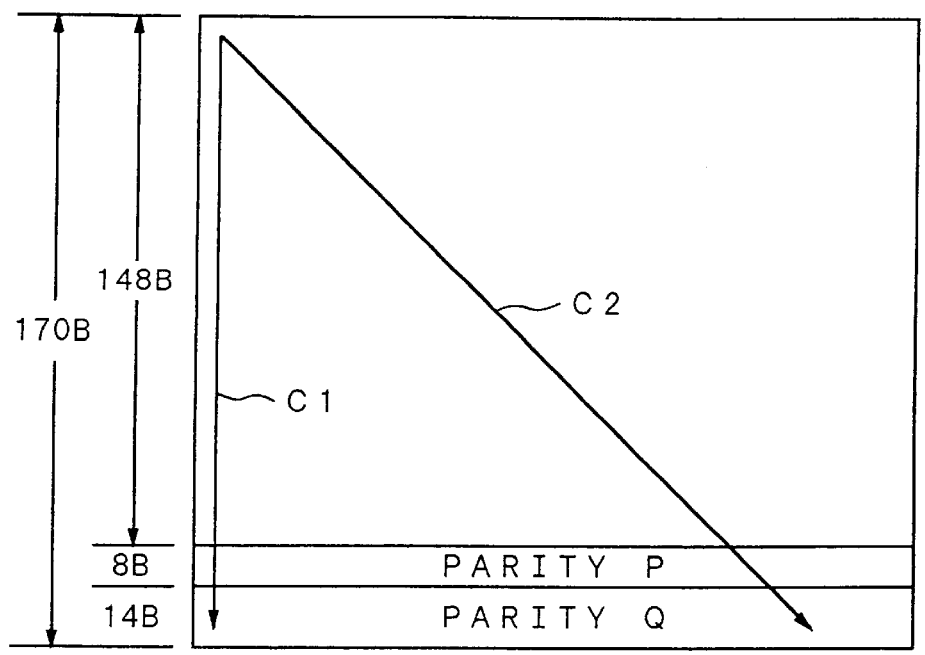
FIG. 9 is a schematic diagram which is used for explaining a conventional data recording method.

In FIG. 1, when a command for a request to rewrite the desired sector data is generated from the host computer 6, the command is sent to the system controller 16 via the control bus and the interface 5. In step ST11 in the flowchart shown in FIG. 8, the system controller 16 judges that there is a rewriting request from the host computer 6, and allows the optical pickup 3 to move to a requested sector on the optical disc 1 with reference to the address information of the header portion added to the head of the sector. After the pickup 3 is moved, the desired sector data is reproduced in a manner similar to the operation shown in FIG. 5 in the foregoing embodiment and is decoded by the error correction decoding circuit 13. For such a decoding period of time, new data for rewriting is supplied from the host computer 6 to the block segmenting circuit 7 through the data bus and interface circuit 5. Namely, in step ST13, rewrite data for newly recording is inputted to the block segmenting circuit 7. In FIG. 8, although steps ST12 and ST13 are shown as continuous steps, they can also be performed in parallel.

In step ST14, in the block desegmenting circuit 14, the reproduced sector data before rewriting is compared with the corresponding sector data of the rewrite data in the block segmenting circuit 7 by the system controller 16, so that differential data between them is obtained. In step ST15, the differential data is temporarily stored in a memory (not shown) provided under the management of the system controller 16 in order to rewrite the data in the parity sector, which will be described hereinafter. In step ST16, the parity P constructed by the C1 sequence of the sector data which is newly recorded is obtained by the error correction encoding circuit 8 and is added to the sector data. In step ST17, the sector data in which the parity P was added is recorded to a target sector as data which was subjected to a modulation such as an EFM or the like through the modulating circuit 9 and the driver 10 by the magnetic head 4 and the optical pickup 3 by a magnetic field modulating method.

When the new data is written to the target sector, the system controller 16 reproduces the data in a manner similar to the foregoing reproduction process, thereby performing the error correction using the parity P by the error correction decoding circuit 13. In the case where errors can be corrected, step ST18 follows and the system controller 16 reads out the data of the parity sector in the block including the rewritten sector. In this case as well, the reproducing operation using the C1 sequence as mentioned above is performed. In the case where the error correction using the parity P is not possible, data is again written to the sector and, after that, a verifying operation is similarly performed by using the parity P. In this case, data can be also recorded onto an alternating sector. In step ST19, the system controller 16 adds the differential data stored in the memory in step ST15 to the read-out data of the parity sector in accordance with the data trains of the C1 and C2 sequences, respectively. Such an adding process is performed by the error correction encoding circuit 8. The error correction encoding circuit 8 obtains new parities P and Q. In step ST20, a parity sector constructed by the obtained parities P and Q is again recorded to the position of the reproduced parity sector on the optical disc 1. The rewriting operation is finished.

As mentioned above, in the case of rewriting a desired sector, it is sufficient to merely obtain the parity Q by adding the differential data between the present data and the data before rewriting to the data of the parity sector and to rewrite the parity sector by the parity Q. Therefore, it is unnecessary to newly obtain the parity data by reproducing all of the data of the encoding block.

As mentioned above, in the case where the parity sector is provided and the desired sector is rewritten, the construction such that the differential data between the present data and the data before rewriting is added to the data of the parity sector and the parity Q is obtained and the parity sector is rewritten is not limited to the construction using the product code. For instance, the invention can be similarly applied to the case of using the cross interleave code. For example, in case of the construction shown in FIG. 3, a construction such that the parity Q is arranged to the sector S8 and the sector S8 is set to the parity sector is considered.

In the data recording/reproducing system shown in FIG. 1, the block segmenting circuit 7, block desegmenting circuit 14, error correction encoding circuit 8, and arranged error correction decoding circuit 13 have been constructed by the independent circuit blocks, respectively. However, a hardware construction in the actual system is constructed by a well-known semiconductor memory such as a DRAM or the like for temporarily storing the sector data and block data and a memory controller having a plurality of registers for designating areas (addresses) in the semiconductor memory. It will be obviously understood that the arithmetic operations are executed by controlling the memory controller by the system controller 16.

Although the header portion in which the addresses have been recorded is provided and the header portion is set to, for example, the pre-pit in the foregoing embodiment, the addresses can be also recorded by wobbles along the groove of the track.

According to the invention, the error correction encoding block is divided into a plurality of portions in a predetermined direction, thereby forming the sectors, and the data of each sector is recorded subsequent to the header in which the address signal is included. Since the sector is formed by dividing the error correction encoding block into a plurality of portions in the predetermined direction, the error correcting process can be performed in one direction in each sector in the error correction encoding block. Upon reproduction, the header is detected, the data is reproduced for every sector, and the error correcting process is performed in one direction in the reproduced data in the sector. In the case where errors cannot be corrected by the error correcting process, the error correction block including the sector is reproduced and the error correcting process is executed in two directions. Therefore, the sector of a small size can be handled, the accessing speed can be improved, and the reliability of data doesn't deteriorate.

The present invention is not limited to the foregoing embodiments but many modifications and variations are possible within the spirit and scope of the appended claims of the invention.

What is claimed is:

1. A method of reproducing data from a disc in which address information is recorded for every sector, said data recorded in correspondence to said address information, and said sector is formed by dividing a block into a plurality of portions in a predetermined direction, comprising the steps of:

a detecting said address information;

reproducing on a sector-by-sector basis the data in each sector on the basis of said address information;

performing on a sector-by-sector basis an error correction for the reproduced data in said each sector in a first data sequence; and in the case where an error in each said sector cannot be corrected, reproducing on a block-by-block basis the data in said block including said each sector and performing on a block—block basis the error correction for the data in said block in the first sequence and a second sequence, wherein the data in said each sector has a first parity data encoded for the first data sequence in said each sector and wherein the data in said block has a second parity data encoded for the second data sequence existing in a plurality of sectors in said block, each of said first and second parity data recorded at an interval of a predetermined number of data bytes, and the step of error correcting in said each sector includes a step of performing an error correction by using said first parity data, and said step of performing the error correction in said block includes a step of executing an error correction by using said first and second parity data.

2. The method of claim 1 wherein the data in said each sector has a first parity data encoded for the first data sequence in said each sector and wherein the data in said block has a second parity data encoded for the second data sequence existing in a plurality of sectors in said block.

3. The method of claim 1 further including the step of extracting data of said each sector reproduced from said block after the error correction is performed on the data in said block.

4. An apparatus for reproducing data from a disc in which a header including address information is recorded for every sector, the data recorded in correspondence to said address information, said sector is formed by dividing a block into a plurality of portions in a predetermined direction, comprising:

means for detecting an address information;

means for reproducing on a sector-by-sector basis the data in each sector on the basis of the address information;

error correcting means for performing on a sector-by-sector basis an error correction for the reproduced data in said each sector in a first data sequence; and control means for controlling said reproducing means such that when an error of the data in said each sector cannot be corrected, all of the data in said block including said each sector is reproduced on a block-by-block basis, and for controlling said error correcting means so as to perform on a block-by-block basis the error correction for the reproduced data in said block in the first data sequence and in a second data sequence, wherein the data in said each sector has a first parity data encoded for the first data sequence which is completed in said each sector and a second parity data encoded for the second data sequence existing in a plurality of said each sector in said block, said first and second parity data recorded at an interval of a predetermined number of data bytes, and said error correcting means performs the error correction for the data in said each sector by using said first parity data and, when errors of the data in said each sector cannot be corrected, said error correcting means further performs the error correction for the data in said block by using said first and second parity data.

5. The apparatus of claim 4 wherein said first parity data is the data encoded for the first data sequence in a horizontal or a vertical direction of said block and said second parity data is the data encoded for the second data sequence in an oblique direction of said block.

6. The apparatus of claim 4 wherein one of the plurality of sectors in said block is a parity sector composed of said first and second parity data and, when errors of the data in said sector cannot be corrected, said reproducing means reproduces said parity sector and said error correcting means again performs the error correction for the data in said sector by using the reproduced parity data in said parity sector.

7. The apparatus of claim 4 further including block desegmenting means for extracting data in the sector to be reproduced in the sector from said block after the error correction is performed on the data in said block.

8. The apparatus of claim 4 wherein, when the data to be reproduced is the data composed of a plurality of sectors, said control means controls said reproducing means so as to reproduce said block including those sectors.

9. The apparatus of claim 7 wherein the data in said each sector has a first parity data encoded for the first data sequence which is completed in said each sector and a second parity data encoded for the second data sequence existing in a plurality of sectors in said block, and wherein said error correcting means performs the error correction for the data in said each sector by using said first parity data and, when errors of the data in said each sector cannot be corrected, said error correcting means further performs the error correction for the data in said block by using said first and second parity data.

10. The apparatus of claim 9 wherein said first parity data is the data encoded for the first data sequence in a horizontal or a vertical direction of said block and said second parity data is the data encoded for the second data sequence in an oblique direction of said block.

11. The apparatus of claim 10 wherein one of the plurality of sectors in said block is a parity sector composed of said first and second parity data and, when errors of the data in said sector cannot be corrected, said reproducing means reproduces said parity sector and said error correcting means again performs the error correction for the data in said sector by using the reproduced parity data in said parity sector.

12. The apparatus of claim 7 wherein, when the data to be reproduced is the data composed of a plurality of sectors, said control means controls said reproducing means so as to reproduce said block including those sectors.

13. A method of reproducing data from a disc in which address information is recorded for every sector, said data recorded in correspondence to said address information, said sector formed by dividing a block into a plurality of portions in a predetermined direction, comprising the steps of:

detecting an address information;

reproducing on a sector-by-sector basis the data in each sector on the basis of said address information;

performing on a sector-by-sector basis an error correction for the reproduced data in said each sector in a first data sequence;

extracting data of each said sector to be reproduced from said block after the error correction is performed on the data in said block; and in the case where an error in said each sector cannot be corrected, reproducing the data in said block and performing the error correction for the data in said in the first data sequence and a second data sequence, wherein the data in said each sector has a first parity data encoded for the first data sequence in said each sector and wherein the data in said block has a second parity data encoded for the second data sequence existing in a plurality of sectors in said block, and the step of error correcting in said each sector includes a step of performing an error correction by using said first parity data, and said step of performing the error correction in said block includes a step of executing an error correction by using said first and second parity data.

14. An apparatus for reproducing data from a disc in which a header including address information is recorded for every sector, the data recorded in correspondence to said address information, said sector formed by dividing a block into a plurality of portions in a predetermined direction, comprising:

means for detecting an address information;

means for reproducing on a sector-by-sector basis the data in each sector on the basis of the address information;

error correcting means for performing on a sector-by-sector basis an error correction for the reproduced data in said each sector in a first data sequence;

control means for controlling said reproducing means in a manner such that when an error in said each sector cannot be corrected, all of the data in said block is reproduced, and for controlling said error correcting means so as to perform the error correction for the reproduced data in said block in the first data sequence and a second data sequence; and block desegmenting means for extracting data to be reproduced in said each sector from said block after the error correction is performed on the data in said block, wherein the data in said each sector has a first parity data encoded for the first data sequence which is completed in said each sector and a second parity data encoded for the second data sequence existing in a plurality of sectors in said block, and wherein said error correcting means performs the error correction for the data in said each sector by using said first parity data and, when said error in said each sector cannot be corrected, said error correcting means further performs the error correction for the data in said block by using said first and second parity data, and further wherein, when the data to be reproduced is the data composed of a plurality of sectors, said control means controls said reproducing means so as to reproduce said block including those sectors.

15. The apparatus of claim 14 wherein said first parity data is the data encoded for the first data sequence in a horizontal or a vertical direction of said block and said second parity data is the data encoded for the second data sequence in an oblique direction of said block.

16. The apparatus of claim 15 wherein one of the plurality of sectors in said block is a parity sector composed of said first and second parity data and, when errors of the data in said each sector cannot be corrected, said reproducing means reproduces said parity sector and said error correcting means again performs the error correction for the data in said each sector by using the reproduced parity data in said parity sector.

* * * * *